April 21, 1964   J. G. WASSNER   3,129,501
BAND TYPE PISTON RING COMPRESSOR
Filed May 8, 1961
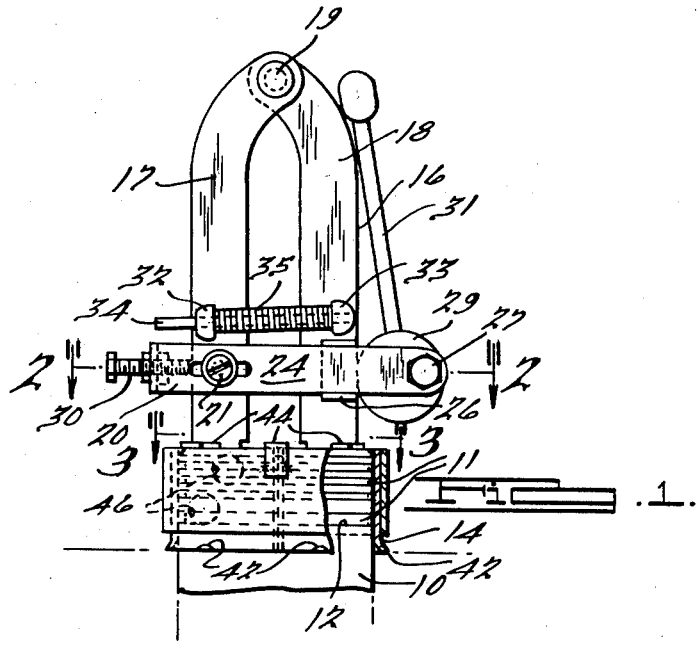
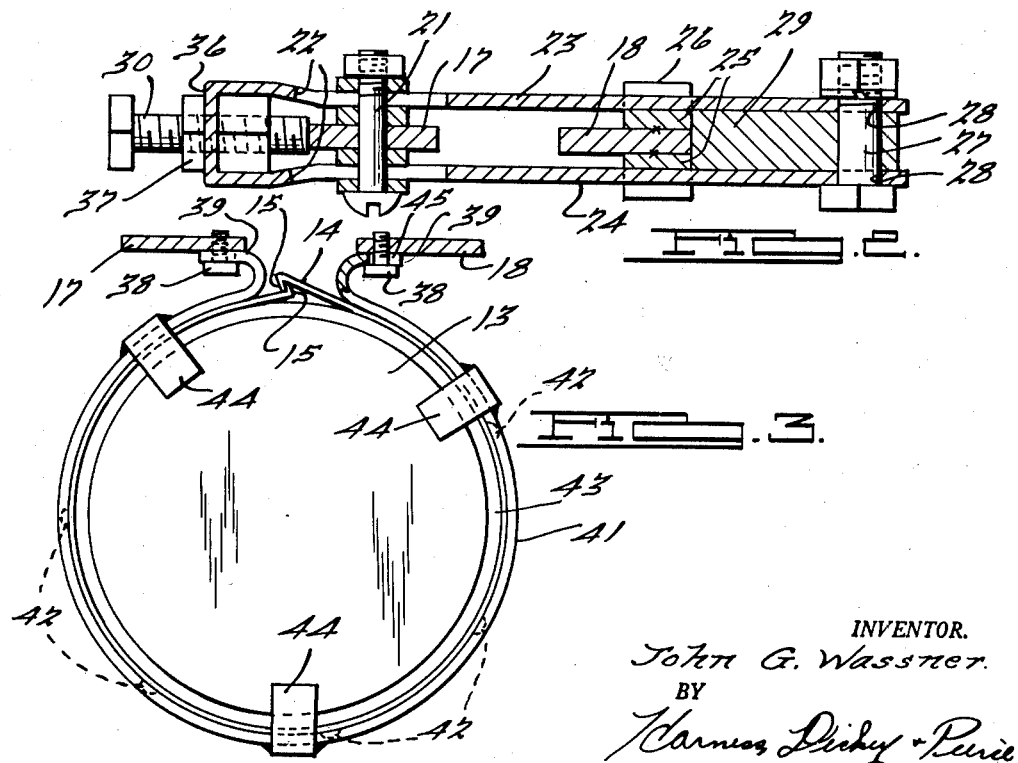
INVENTOR.
John G. Wassner.
BY
Harness Dickey & Pierce
ATTORNEYS

United States Patent Office

3,129,501
Patented Apr. 21, 1964

3,129,501
BAND TYPE PISTON RING COMPRESSOR
John G. Wassner, Pontiac, Ill., assignor to Rebuilt Engine Products Company, Detroit, Mich., a corporation of Michigan
Filed May 8, 1961, Ser. No. 108,455
5 Claims. (Cl. 29—269)

This invention relates to band applying devices, and particularly to a banding device and to the method of applying a band to a piston for collapsing the rings thereon.

Difficulty has always been experienced when inserting a piston with its rings into a cylinder of an engine block and for shipping and storing the pistons with the rings thereon ready for use. As the bore size is enlarged due to wear or as the result of a honing operation, larger pistons and rings are required. Thus, the piston and ring size may vary from 20-, 40- and 60-thousandths from an initial diameter. When the pistons are furnished with the rings, they are mounted within the annular grooves at the head end of the piston and are retained therein preferably by a band which collapses the rings within the grooves, with the ends overlapped.

The bands are straight pieces of thin stock having outwardly extending projections at the bottom edge which engage the top of the engine block when the piston is moved therefrom into the cylinder. The ends of the bands are reversely bent so that they can overlap in a gripping relationship and be flattened against the piston and permanently locked to each other.

A clamp is provided for drawing the ends of the band together and collapsing the rings within the piston grooves. The clamp has a pair of pivoted arms provided with extending bosses which engage the reversely disposed ends of a circular collar for moving the ends together when a cam on the clamp is operated to move one arm toward the other. The projections at the ends of the band can be overlapped between the ends of the applying collar and flattened into locked relationship. Each of the arms carries a pivoted boss with a coil spring on a rod disposed therebetween. The rod is secured to one of the bosses and is movable through the other boss. The spring returns the arms to separated position against the cam when the cam is moved to released position. When the band is to be applied to the piston rings of a piston, the rings are first expanded over the piston head into the grooves and the band is placed thereover, with the projections at the bottom in position to engage the top of the cylinder block. The collar is placed over the band and retained in aligned relation therewith by inwardly extending fingers at the top which engage the top of the piston. The collapsing tool has extending studs which engage the separated reversely extending ends of the collar which are drawn together when the cam is operated. The piston rings are collapsed within the grooves when the ends of the band are moved into overlapping relation to each other. The ends are flattened against the piston and are locked in secured position with the rings maintained collapsed within the grooves. Upon the release of the cam, the attaching collar is enlarged and removed, along with the clamp, from the secured band.

Accordingly, the main objects of the invention are: to provide a band with spaced outward projections at the bottom, interlockable ends, and apertures through the body through which the collapsed rings are visible; to move the ends of a securing band into engaged relation by a split collar of an applying device which collapses the piston rings within the piston grooves where they are retained by the band when the ends are permanently secured together, and, in general, to provide a band applying device which is simple in construction, positive in operation and economical of manufacture.

Other objects and features of novelty of the invention will be specifically pointed out or will become apparent when referring, for a better understanding of the invention, to the following description, taken in conjunction with the accompanying drawing, wherein:

FIGURE 1 is a broken view in elevation of a band applying device embodying features of the present invention;

FIG. 2 is an enlarged, sectional view of the structure illustrated in FIG. 1, taken on the line 2—2 thereof, and FIG. 3 is an enlarged, sectional view of the structure illustrated in FIG. 1, taken on the line 3—3 thereof.

A piston 10 has a plurality of rings 11 disposed in annular grooves 12 located at the top of the head portion 13 of the piston which has a peripheral chamfered edge 43 at the top. The rings are herein illustrated as being retained collapsed within the grooves 12 by a thin flexible band 14. The band has reversely bent ends 15 which are moved into interlocking relationship and then flattened against the side of the piston wall into locked engagement.

A collapsing device 16 is employed for attaching the band to the piston and moving the interlocking ends 15 into engagement with each other. The device has two pivoted arms 17 and 18 secured together by a rivet 19. A U-shaped bracket 20 is adjustably supported on the arm 17 by a bolt 21 extending within slots 22 in arms 23 and 24 of the bracket. The arm 18 has a channel element 25 welded or otherwise secured thereto containing flanges 26 which receive the arms 23 and 24, retaining them substantially normal to the arms 17 and 18. A bolt 27 extends through apertures 28 in the ends of the arms 23 and 24 and is press-fitted or otherwise secured to a cylindrical cam 29 in off-center relation thereto. The cam 29 has an operating handle 31 extending outwardly of the peripheral edge thereof.

A pair of pivoted bosses 32 and 33 are secured on one face of the arms 17 and 18, respectively, with a rod 34 threaded or otherwise fixedly secured in the boss 33. The other end of the rod is longitudinally movable within the aperture through the boss 32. A spring 35 on the rod 34 is disposed between the bosses 32 and 33 for applying a force to move the arms 17 and 18 away from each other. The arm 18 is movable outwardly from the arm 17 an amount equal to the distance from the center of the bolt 27 and the remote point on the peripheral edge of the cam 29. A greater or lesser span will result from the cam movement by shifting the bolt 21 within the slot 22. This moves the arm 17 closer to or farther away from the arm 18, with the arm left free to be moved the maximum distance by the cam 29, as pointed out hereinabove. A setscrew 30, extending inwardly from the web 36 of the bracket 20, abuts the arm 17 and prevents it from moving toward the web when the spring 35 is tensioned. A nut 37 clamps the setscrew 30 in adjusted position.

Each of the arms 17 and 18 carries a screw 38 at its lower end in position to receive the reversely bent ends 39 of a collar 41 which is made of strap material. The strap material is preferably resilient to permit the collar to expand when the arms 17 and 18 are moved apart upon the retraction of the cam 29. The band 14 has projections 42 at the bottom which rest upon the engine block about the bore, permitting the piston and rings to be moved therefrom into the bore. The collar 41 has fingers 44 extending inwardly at the top for resting on the head of the piston inwardly of a chamfered edge 43. The fingers position the band 14 relative to the top of the piston head portion in alignment with the rings in the piston grooves. After the rings 11 have been disposed within the annular grooves 12 at the head end of the piston, the band 14 is disposed within the collar 41 and moved over the rings and aligned therewith when the fingers 44 engage the top of the piston. The ends 39 of the collar 41 have the apertures 45 engaged by the screws 38 secured to the lower ends of the arms 17 and 18. The engagement of the collar 41 with the screws 38 may occur before the collar is applied to the head end of the piston or after it has been applied thereto, whichever is the more convenient. Thereafter, the operating handle 31 is moved upwardly toward the arm 18, as illustrated in FIG. 1, to have the cam 29 move the arm 18 toward the arm 17. This moves the ends 15 of the bands 14 into overlapping relationship which is made permanent when the ends are flattened upon themselves against the piston wall. Thereafter, the handle 31 is moved clockwise, downwardly, away from the arm 18 to permit the spring 35 to move the arm 18 outwardly to thereby permit the collar 41 to expand and release the band 14 which remains fixed to the piston. A pair of offset apertures 46 is provided through the band 14 through which the rings 11 may be inspected.

When a piston is to be applied to a cylinder of an engine block, the skirt end of the piston is inserted in the cylinder until the bottom end of the band 14 engages the area of the block about the cylinder. Pressure is applied to the head to move the piston from the band and to advance it and the rings to within the cylinder. This eliminates the necessity of collapsing each of the rings separately as they are advanced to within the cylinder and provides a considerable amount of saving in time as well as breakage. Collars 41 may be provided for the different steps of enlargement of the cylinder from the standard sizes thereof. The collars are readily attached to the screws 38 of the arms 17 and 18, as pointed out hereinabove.

What is claimed is:

1. In a device for applying a band to the head end of a piston for retaining the rings thereof collapsed within the annular grooves thereabout, a cylindrical collar having ends which are spaced apart, a pair of arms pivoted at one end and having attaching means at the other end for engaging the spaced ends of the collar, cam means on said arms for moving said arms together for drawing the ends of the collar toward each other and reducing the diameter thereof, means for adjusting said arms relative to each other for controlling the spacing thereof, and a band disposed within the collar with the ends at the opening, said ends having interlocking portions which may be engaged when the band is reduced in diameter sufficiently to collapse the piston rings.

2. In a device for applying a band to the head end of a piston for retaining the rings thereof collapsed within the annular grooves thereabout, a cylindrical collar having ends which are spaced apart, a pair of arms pivoted at one end and having attaching means at the other end for engaging the spaced ends of the collar, cam means on said arms for moving said arms together for drawing the ends of the collar toward each other and reducing the diameter thereof, radially extending fingers on the top of said collar for engaging the top of the piston and locating the collar relative to the piston rings, spring means for urging said pivoted arms apart in engagement with said cam means, means for adjusting said arms relative to each other for controlling the spacing thereof, and a band disposed within the collar with the ends at the opening, said ends having interlocking portions which may be engaged when the band is reduced in diameter sufficiently to collapse the piston rings.

3. In a device for applying a band to the head end of a piston for retaining the rings thereof collapsed within the annular grooves thereabout, a cylindrical collar having ends which are spaced apart, a pair of arms pivoted at one end and having attaching means at the other end for engaging the spaced ends of the collar, cam means on said arms for moving said arms together for drawing the ends of the collar toward each other and reducing the diameter thereof, radially extending fingers on the top of said collar for engaging the top of the piston and locating the collar relative to the piston rings, spring means for urging said pivoted arms apart in engagement with said cam means, means for adjusting said arms relative to each other for controlling the spacing thereof, and a band disposed within the collar with the ends at the opening, said ends having interlocking portions which may be engaged when the band is reduced in diameter sufficiently to collapse the piston rings, said band having at least one aperture through which the collapsed rings are visible and having projections at the bottom.

4. In a device for applying a band to the piston rings of a piston, a collar of cylindrical form having the ends spaced apart and having inwardly extending portions for engaging the top of the piston and locating the collar relative thereto, a pair of arms, means for pivoting one end of the arms together, means for securing the other end of the arms to the spaced ends of the collar, a bracket adjustably secured to one of said arms, a cam carried by the bracket in engagement with the other of said arms for moving the arms together, and a spring between said arms for moving them apart when the cam means is retracted.

5. In a device for applying a band to the piston rings of a piston, a collar of cylindrical form having the ends spaced apart and having inwardly extending portions for engaging the top of the piston and locating the collar relative thereto, a pair of arms, means for pivoting one end of the arms together, means for securing the other end of the arms to the spaced ends of the collar, a bracket adjustably secured to one of said arms, a cam carried by the bracket in engagement with the other of said arms for moving the arms together, and a spring between said arms for moving them apart when the cam means is retracted, and an adjusting screw for retaining said arms is adjusted position.

References Cited in the file of this patent

UNITED STATES PATENTS

| | | |
|---|---|---|
| 225,216 | Earle | Mar. 9, 1880 |
| 299,889 | Whiting | June 3, 1884 |
| 633,790 | Burgher | Sept. 26, 1899 |
| 765,825 | Felker | July 26, 1904 |
| 1,017,828 | Wake | Feb. 20, 1912 |
| 1,148,472 | Adams | July 27, 1915 |
| 1,368,655 | Reich | Feb. 15, 1921 |
| 1,377,730 | Rogers | May 10, 1921 |
| 1,767,819 | Solenberger | June 24, 1930 |
| 2,632,934 | Thompson | Mar. 31, 1953 |